Oct. 30, 1962 G. M. MARTIN 3,060,816
DEVICE FOR FORMING HOLES IN BLANKS
Filed Nov. 18, 1958 2 Sheets-Sheet 1
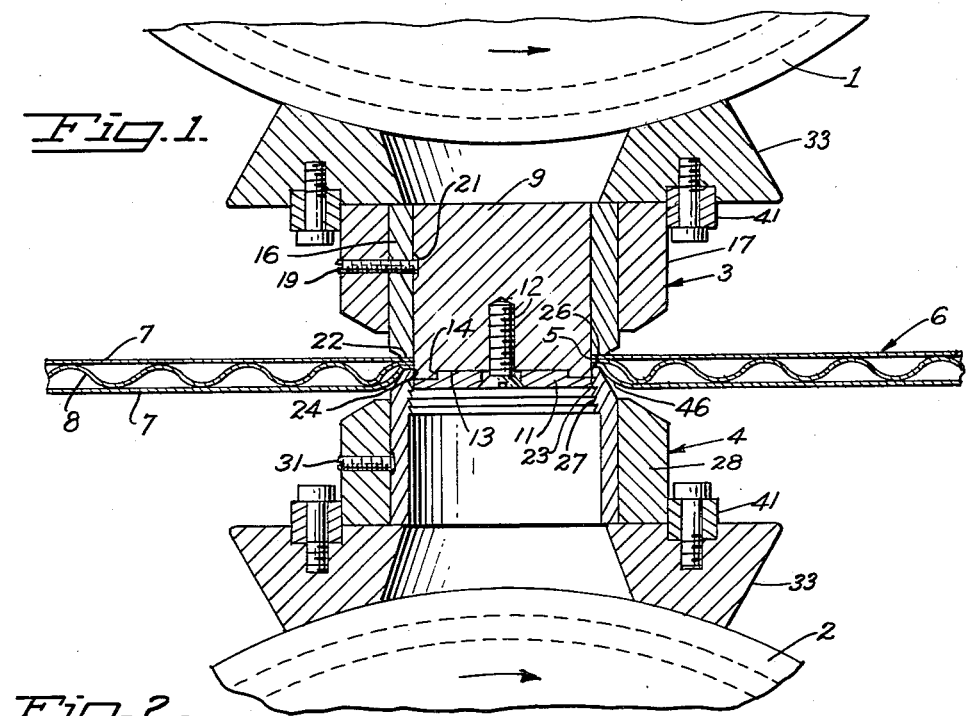
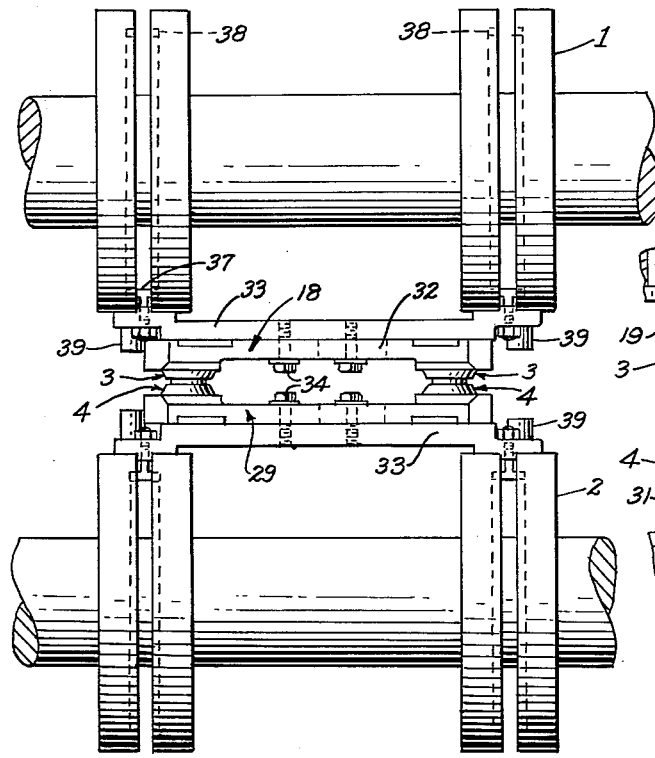
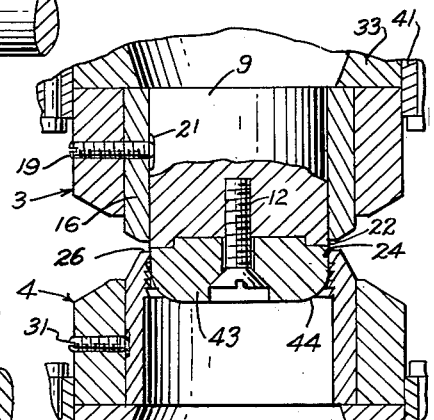
INVENTOR.
GEORGE M. MARTIN
BY George B. White
ATTORNEY.

Oct. 30, 1962 G. M. MARTIN 3,060,816
DEVICE FOR FORMING HOLES IN BLANKS
Filed Nov. 18, 1958 2 Sheets-Sheet 2
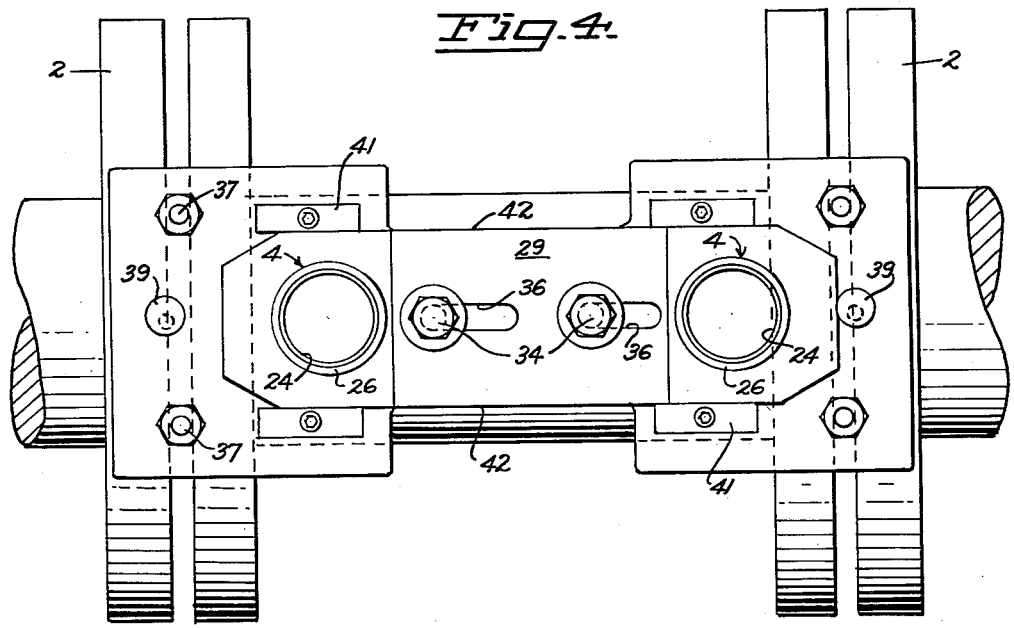
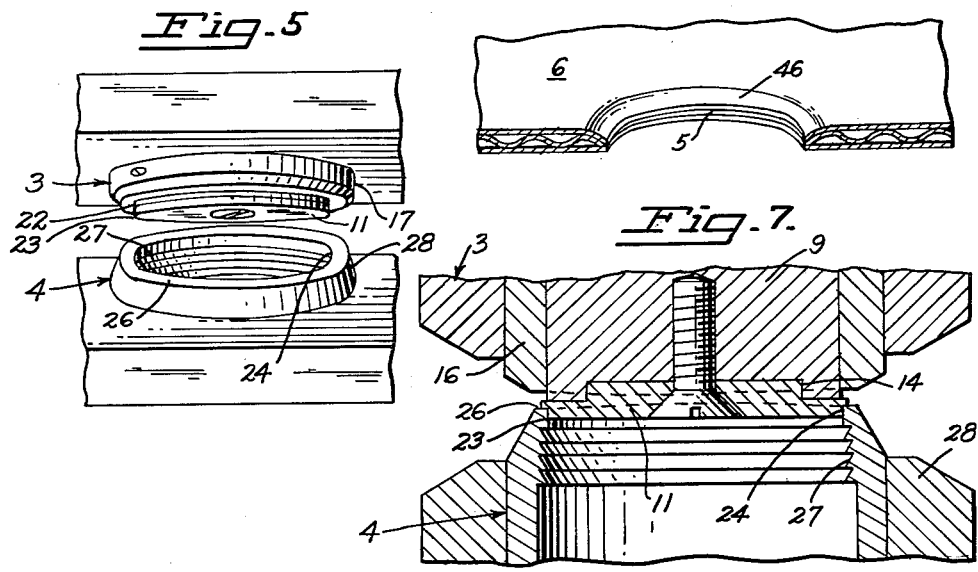
INVENTOR.
GEORGE M. MARTIN
BY George B. White
ATTORNEY.

United States Patent Office 3,060,816
Patented Oct. 30, 1962

3,060,816
DEVICE FOR FORMING HOLES IN BLANKS
George M. Martin, Emeryville, Calif., assignor to Merrill D. Martin, Oakland, Calif.
Filed Nov. 18, 1958, Ser. No. 774,683
5 Claims. (Cl. 93—58.2)

This invention relates to a device and method for forming holes in blanks and particularly in blanks of compressible sheet material, such as fibre-board or the like.

This invention has as its object the solution of the problem of producing exteriorly sharp contoured holes without the disadvantage of sharp edges or corners on the inside surfaces of containers and thereby avoiding injury to the contents. It was found in shipping fruit or produce in fibre-board or corrugated fibre-board boxes that the sharp inside corners or edges of holes in the walls of the box damage the skin or rind of the fruit and such damage causes the development of fungus and other injury and spoilage. By forming the holes in accordance with this invention so that the inner edges or corners of the holes are depressed or recessed such injury to the contents is avoided.

Other objects of the invention are to provide accurately aligned dies on rotary punching apparatus so as to cut exteriorly sharp holes yet indent the edges of the holes on the side of the blank which forms the inside surface of a container, means being provided for predetermining the depth of the recess or dent and also for limiting the climbing of the blank on the male die; the herein method and device generally also prevents the breaking of the edges of the holes as they are formed.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specifiacation, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a cross sectional view of the dies in cutting position.

FIG. 2 is a fragmental view of the rotary cutting machine illustrating the relative cutting position of the dies on the rotating elements.

FIG. 3 is a sectional view of a set of dies with an aligner element in position.

FIG. 4 is a top plan view of a set of female dies and the adjusting device therefor.

FIG. 5 is a fragmental perspective view illustrating the relative position of the dies approaching cutting position.

FIG. 6 is a sectional perspective view of a blank showing a hole formed in accordance with my invention, and FIG. 7 is a fragmental sectional view of the dies showing the shearing action on the replaceable male die disc, for shearing the cutting edge to exact size.

Boxes or cartons used for shipping fruit, produce and other goods, are usually made of so called corrugated fibre-board. Such fibre-board is compressible so as to reduce its thickness at the compressed area. When a sharp hole is correctly punched into a fibre-board blank, the edges of the hole on both faces of the sheet or blank are sharp. The sharpness on the inside of the box scratches or cuts the skin, rind or surface of the items in the container which results in injury to the contents.

In my method the hole is punched and simultaneously with and by the force of the punching action or motion, the fibre-board material around the inside edge of the hole is compressed so as to form a dent around the hole recessed from the inside surface or plane of the blank or sheet.

As part of the method, penetration and relative motion of the male and female punching dies toward one another is limited, and climbing of the blank on the male die is also limited to facilitate withdrawal of the male die from the hole without breaking the edges of the hole and to provide backing for the compressing force. The relative movement of the male die and female die is substantially tangential rolling motion with minimum penetration to shear through the blank progressively.

Holes in fibre-board sheets or blanks are punched in rotary punching machines, wherein rollers 1 and 2 are driven in opposite directions to one another so that their adjacent peripheries or surfaces move in the same direction generally tangentially and at about the same lineal speed. A male punching die 3 is mounted on one roller 1 and a complemental hollow female die 4 is mounted on the other roller 2 so that the dies 3 and 4 meet with relative tangential rolling motion, the male die progressively entering and then leaving the female die 4 as the rollers are rotated, and penetrating and punching with shearing action a hole 5 in a fibre-board blank 6, positioned between the dies.

The blank 6 is of a compressible material such as corrugated fibre-board, which has three layers, namely outer card board layers 7 and a middle corrugated layer 8.

The male die 3 includes a body 9 and a replaceable punching die disc 11, which latter is secured to the body 9 by a recessed screw 12. The die disc has a boss 13 on its bottom fitting into a locating recess 14 in the adjacent face of the body 9 for locating the die disc 11.

The body 9 is held in a limiting sleeve 16 by pressfit, and the limiting sleeve 16 is pressed into a socket 17 of a die holder 18. A set screw 19 extends through a side of the socket 17 and through the sleeve 16 against a flattened portion 21 on the periphery of the die body 9 for further securing these elements together in properly aligned position.

The outer end of the limiting sleeve 16 is spaced from the end of the die disc 11 so as to form a flat limit shoulder 22 to limit the climbing of the blank on the male die. The spacing of the limit shoulder 22 from the cutting edge 23 of the disc 11 is equal to or less than the thickness of the blank 6, so as to function as backing for the compression of the blank 6.

The female die 4 includes a hollow cutter with inner cutting edge 24 surrounded by a flat pressure ring 26 opposite to and registering with the male limit shoulder 22. The inside periphery of the female die 4 near the cutting edge 24 is provided with serartions 27 to catch the cut-out pieces from the blank. The outer periphery of the female die 4 at the end adjacent said flat pressure ring 26 is beveled.

The female die 24 is pressed into a socket 28 of a die holder 29 and is additionally secured by a set screw 31 extended through a side of the socket 28.

The die holders 18 or 29 are formed, preferably in pairs, on a base plate 32 so that the pair of male die holders 18 are symmetrical with the opposite pair of female die holders 29. Each base plate 32 is secured on a mounting plate 33 by bolts 34 extended through slots 36 which latter are longitudinal in the base plate 33 so as to permit longitudinal adjustment of the base plate 32 on the mounting plate 33, axially of the respective rollers.

Each mounting plate 33 is mounted at its ends by bolts 37 in suitable mounting grooves 38 on the respective rollers 1 or 2. Opposite each end of each base plate 32 is an adjusting cam 39 rotatably held in the mounting plate 33. The base plate 32 is abutted against one of said cams 39 and then by turning the cam 39 the position of the base plate 32 can be finely adjusted. Spaced pairs of alignment guides 41 on the mounting plate 33 engage and guide the opposite longitudinal edges 42 of each base plate 32.

In operation the respective pairs of male and female dies are mounted as heretofore described on the respective rollers generally symmetrically so that generally registering ends of their base plates 32 abut the respective adjacent cams 39. Then by turning the cams 39 the alignment is made more accurate. At this time each male die has in place of its die disc 11 an aligning button 43 which fits on the end of the male die body 9 but has rounded edge 44 of an outer diameter sufficiently smaller than the diameter of the die disc 11 to enter the female die with almost touching clearance. This clearance in practice is about −.003 to −.005 inch. The rollers are then turned to move the aligning buttons 43 into the respective female dies 4. In this position the mounting bolts 37 are tightened. Then the rollers are turned to permit the removal of the aligning buttons 43 and replacing them with the die discs 11.

Each die disc 11 is somewhat softer than the female die cutting edge 24 and is larger by an almost cutting clearance. In practice the disc 11 is larger than the cutting edge 24 by a clearance of about +.003 to +.005 inch. Thus during the first penetration of the male die disc 11 into the female cutting edge 24 the male die disc 11 is sheared to exact fit for accurate cutting operation, as shown in FIG. 7.

As the rollers are rotated the male die disc 11 enters the female die cutting edge 24 progressively generally tangentially to the minimum depth needed to shear through the blank 6. The spacing of the limit shoulder 22 from the male cutting edge on the disc 11 being generally equal to or less than the thickness of the blank 6, during the progressive relative overlapping of the male cutting edge 23 and the female cutting edge 24, the blank 6 climbs on the male die so that one surface thereof is backed against the flat limit shoulder 22 and simultaneously the blank 6 is compressed by the forming end of the female die on its other face around the hole so as to form a recess thereby to space or recess the adjacent edge of the hole from the blank surface. The natural resiliency of the fibre-board sheet will expand the bottom of the compressed area somewhat after the pressure is relieved but will still leave a permanent recess 46 about one side of the hole 5. The cut-out is retained by the serrations 27 in the hollow female die 4 and is progressively pushed by subsequent cut-outs through the cavity of the female die 4 for ultimate ejection from the machine.

The method steps in forming the hole in the blank are: the positioning of the blank between a male and female die; then progressively overlapping the cutting edges of the dies generally tangentially to cut or shear the hole through blank; limiting the climbing of the blank on the male die so as to back the adjacent face of the die, which is to form the outer surface of the container; simultaneously with, and by the force of cutting, compressing the other face of the fibre-board against said backing so as to permanently space or recess the adjacent edge of the hole from the face of the blank, which latter face is to form the inner surface of the container to be made from said blank.

The resultant article of manufacture is a blank for a box or container having a face to form the outer surfaces of the box and an opposite face to form the inner surfaces of the box, and holes through said blank the inner surface edges of which are recessed from said inner surface. The ultimate article is a box or container with holes through a wall thereof, wherein the inner edges of the holes are recessed from the inner surface of said box wall.

I claim:

1. In a rotary cutting mechanism for compressible material, the combination with two rolls having their axes generally parallel, of cooperating male and female hole cutting dies carried by the respective rolls, said dies having cooperating cutting edges defining the entire circumference of a hole to be cut thereby and overlapping substantially tangentially in cutting positions relatively to one another, a limit shoulder on the outer periphery of the male die spaced from the cutting edge of said male die to a distance about equal to the thickness of the blank to be cut to limit the climbing of the blank on the male die and to engage one face of the blank about the hole cut by said dies, a forming end on the female die and around the cutting edge of the female die, adapted to compress the material of the blank about said hole so as to form a depressed recess about the adjacent side of the hole, said limit shoulder holding the material at the side of the hole on such shoulder generally flat, a base plate for each die, detachable means to secure each die to its base plate, a mounting member on each roll, each base plate having elongated slots therein generally parallel with the axis of the roll, bolt elements extended through said slots to fasten the base plate on its mounting member in adjusted position, and an adjusting cam rotatably mounted on each mounting member opposite each end of the base plate for accurately adjusting the base plate longitudinally on its mounting plate.

2. A rotary cutting mechanism for cutting holes in compressible material, comprising, in combination:
   (a) a pair of rotably mounted rolls having spaced axes; and
   (b) a pair of cooperating male and female hole cutting dies carried by the respective rolls and having cutting edges defining closed curves which progressively overlap substantially tangentially of the imaginary surfaces of revolution defined by said cutting edges upon rotation of said rolls to define a cutting zone by the overlap, whereby material fed along said substantially tangential path will have holes cut therein in said cutting zone, said dies including
      (1) a limit shoulder on the outer periphery of the male die and spaced from the cutting edge of said male die a distance substantially equal to the thickness of the material to be cut to limit the pentration of the material into said male die and to engage one face of the material surrounding a hole cut by said dies, and
      (2) a forming end on the female die adjacent to and surrounding the cutting edge thereof and having a depressing surface which is spaced from said limit shoulder in the fully overlapping position of said dies a distance less than the thickness of the material to be cut, whereby simultaneously with the cutting operation a recess is formed in the female die facing surface of the material in the entire area surrounding a hole cut by said dies.

3. A rotary cutting mechanism for cutting holes in compressible material, comprising, in combination:
   (a) a pair of rotatably mounted rolls having spaced axes; and
   (b) a pair of cooperating male and female hole cutting dies carried by the respective rolls and having cutting edges defining closed curves which progressively overlap substantially tangentially of the imaginary surfaces of revolution defined by said cutting edges upon rotation of said rolls to define a cutting zone by the overlap, whereby material fed along said substantially tangential path will have holes cut therein in said cutting zone, said dies including
(1) a limit shoulder on the outer periphery of the male die and spaced from the cutting edge of said male die a distance which is at most equal to the thickness of the material to be cut to limit the penetration of the material onto said male die and to engage one face of the material surrounding a hole cut by said dies,
(2) a pressure end on the female die immediately adjacent to and surrounding the cutting edge thereof and having a depressing surface which is spaced from said limit shoulder in the fully overlapping position of said dies a distance less than the thickness of the material to be cut, whereby simultaneously with the cutting operation a recess is formed in the female die facing surface of the material in the entire area surrounding a hole cut by said dies, said female die being hollow to permit penetration of the male die thereinto, the cutting edges of the female die being defined by the upper interior surface and the adjacent male die facing surface, and
(3) a plurality of serrations formed in the interior surface of said female die to catch the cut-out pieces.

4. A rotary cutting mechanism for cutting holes in compressible material, comprising, in combination:
(a) a pair of rotatably mounted rolls having spaced axes; and
(b) a pair of cooperating male and female hole cutting dies carried by the respective rolls and having cutting edges defining closed curves which progressively overlap substantially tangentially of the imaginary surfaces of revolution defined by said cutting edges upon rotation of said rolls to define a cutting zone by the overlap, whereby material fed along said substantially tangential path will have holes cut therein in said cutting zone, said dies including
(1) a limit shoulder on the outer periphery of the male die and spaced from the cutting edge of said male die a distance substantially equal to the thickness of the material to be cut to limit the penetration of the material onto said male die and to engage one face of the material surrounding a hole cut by said dies,
(2) a forming end on the female die adjacent to and surrounding the cutting edge thereof and having a depressing surface which is spaced from said limit shoulder in the fully overlapping position of said dies a distance less than the thickness of the material to be cut, whereby simultaneously with the cutting operation a recess is formed in the female die facing surface of the material in the entire area surrounding a hole cut by said dies, said female die being hollow to provide for penetration thereinto of the male die, and
(3) a replaceable punching die disc on the end of said male die, said disc being adapted to define said cutting edges and penetrate said female die, said disc being initially slightly larger in dimensions and constructed of a softer material than the cutting edge of said female die, whereby during the first penetration of said male die disc into said female die, said disc will be sheared to an exact fit for subsequently performing accurate cutting operations.

5. In a rotary cutting mechanism for cutting holes in compressible material, the combination which comprises:
(a) a pair of rotatably mounted rolls having spaced axes; and
(b) a pair of cooperating male and female hole cutting die holders carried by the respective rolls to which may be connected dies having cutting edges defining closed curves which will progressively overlap substantially tangentially of the imaginary surfaces of revolution defined by the cutting edges upon rotation of said rolls to define a cutting zone by the overlap, whereby material fed along said substantially tangential path will have holes cut therein in said cutting zone, said female die having a die connected thereto, said die including a forming end on the female die adjacent to and surrounding the cutting edge thereof and having a depressing surface which may be spaced from a limit shoulder on a male die in the fully overlapping position of said dies a distance less than the thickness of the material to be cut, whereby simultaneously with the cutting operation a recess is formed in the female die facing surface of the material in the entire area surrounding a hole cut by the dies, and
(c) a locating button detachably mounted on said male die holder and slidably fitting into said female die for calibrating the location of the male die relative to the female die, said locating button having an outer diameter sufficiently smaller than the female die to enter the latter, and a rounded projecting end for easy penetration of said female die.

References Cited in the file of this patent
UNITED STATES PATENTS

| | | |
|---|---|---|
| 1,040,497 | Bosler | Oct. 8, 1912 |
| 1,358,328 | Reznor | Nov. 9, 1920 |
| 1,977,812 | Swift | Oct. 23, 1934 |
| 2,485,020 | Staude | Oct. 18, 1949 |
| 2,621,847 | Stefanich | Dec. 16, 1952 |
| 2,736,483 | Moore | Feb. 28, 1956 |
| 2,765,714 | Wischusen | Oct. 9, 1956 |
| 2,772,610 | Arneson | Dec. 4, 1956 |

FOREIGN PATENTS

| | | |
|---|---|---|
| 511,806 | Great Britain | Aug. 24, 1939 |